Oct. 1, 1946.   E. H. BENNETT   2,408,599
ARTICLE TRANSFER MECHANISM
Filed June 5, 1945   5 Sheets-Sheet 1

Inventor
E. H. BENNETT
By Rule and Hoge
Attorneys

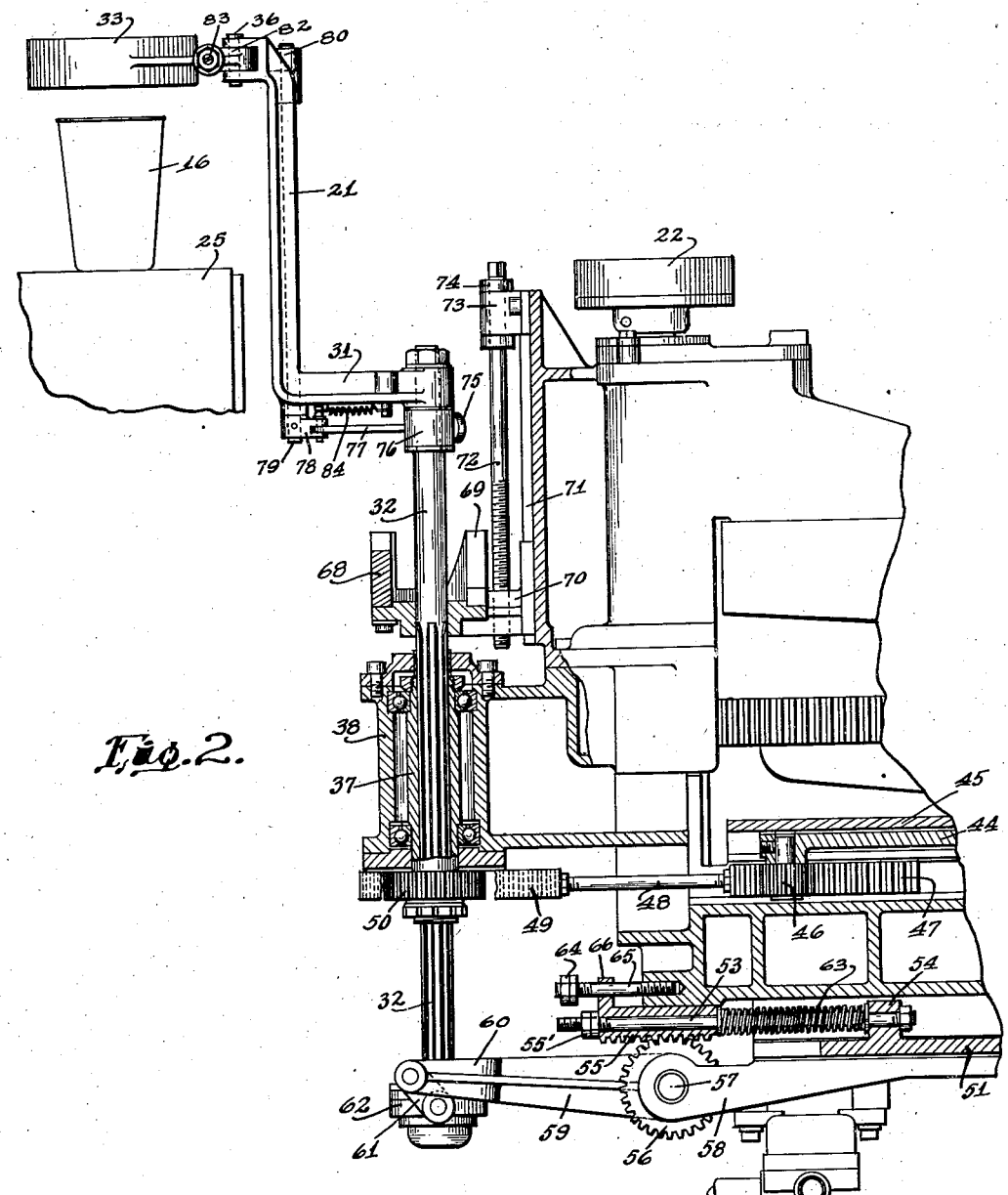

Oct. 1, 1946.   E. H. BENNETT   2,408,599
ARTICLE TRANSFER MECHANISM
Filed June 5, 1945   5 Sheets-Sheet 3

Inventor
E. H. BENNETT
By Rule and Hoge
Attorneys

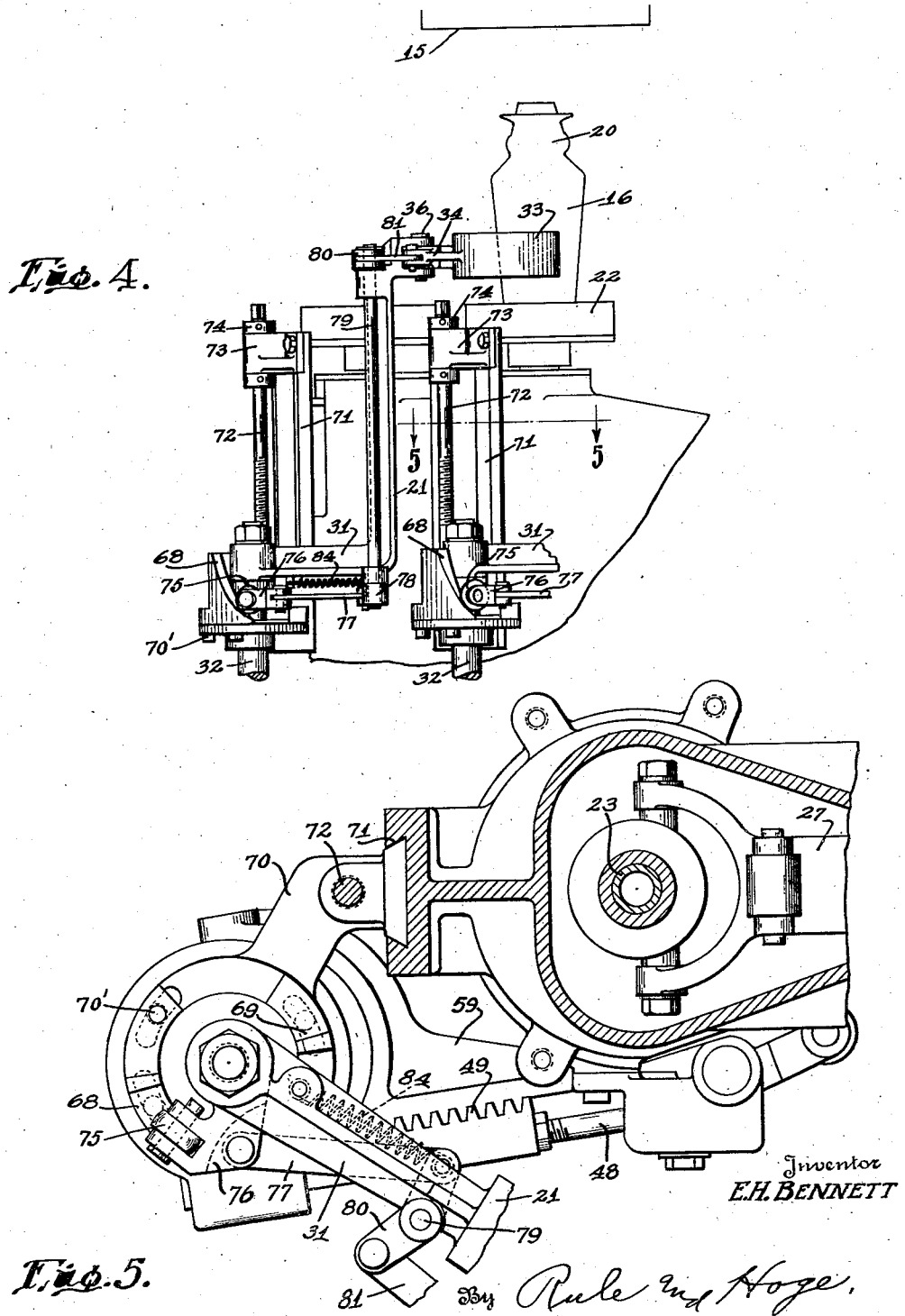

Inventor
E. H. BENNETT
By Rule & Hoge
Attorneys

Patented Oct. 1, 1946

2,408,599

UNITED STATES PATENT OFFICE 2,408,599

ARTICLE TRANSFER MECHANISM

Edward H. Bennett, Toledo, Ohio, assignor to Owens-Illinois Glass Company, a corporation of Ohio Application June 5, 1945, Serial No. 597,687

9 Claims. (Cl. 198—210)

My invention relates to mechanism for transferring articles from one position to another or from one moving apparatus or machine to another. The invention provides automatic mechanism including article-transfer arms or units mounted on a rotating carriage and adapted to take articles or workpieces from a predetermined position adjacent to the carriage, transfer them to a position on the carriage and, after certain operations on the workpieces, transfer them from the carriage to a traveling conveyor or other receiving means.

The invention in the form herein illustrated comprises article-transfer units combined with and forming part of automatic mechanism for manufacturing hollow glass articles such as tumblers, jars, and the like. Such mechanism includes a blowing machine having a rotating carriage with an annular series of blowpipes or spindles thereon by means of which individual charges of glass are blown to hollow form, and a separate "burn-off" machine. The latter comprises a carriage with burners thereon by which the blown articles are severed from the waste glass or moil.

An object of the present invention is to provide a novel and practical mechanism for transferring the blown articles to and from the burn-off machine, such mechanism comprising transfer arms mounted on the burn-off machine and operable automatically to take the articles from the blowing machine, place them on the burn-off machine and after the burn-off operation again pick up the articles and transfer them to a conveyor or the like.

Other objects of the invention will appear hereinafter.

Referring to the accompanying drawings:

Fig. 2 is a fragmentary sectional elevation on a larger scale than Fig. 1, showing particularly a transfer unit including the transfer arm and operating mechanism therefor.

Fig. 4 is a fragmentary elevational view showing portions of adjacent transfer units.

Fig. 5 is a fragmentary sectional plan view on a comparatively larger scale, the section being take at the line 5—5 on Fig. 4.

Figures 1, 1A:
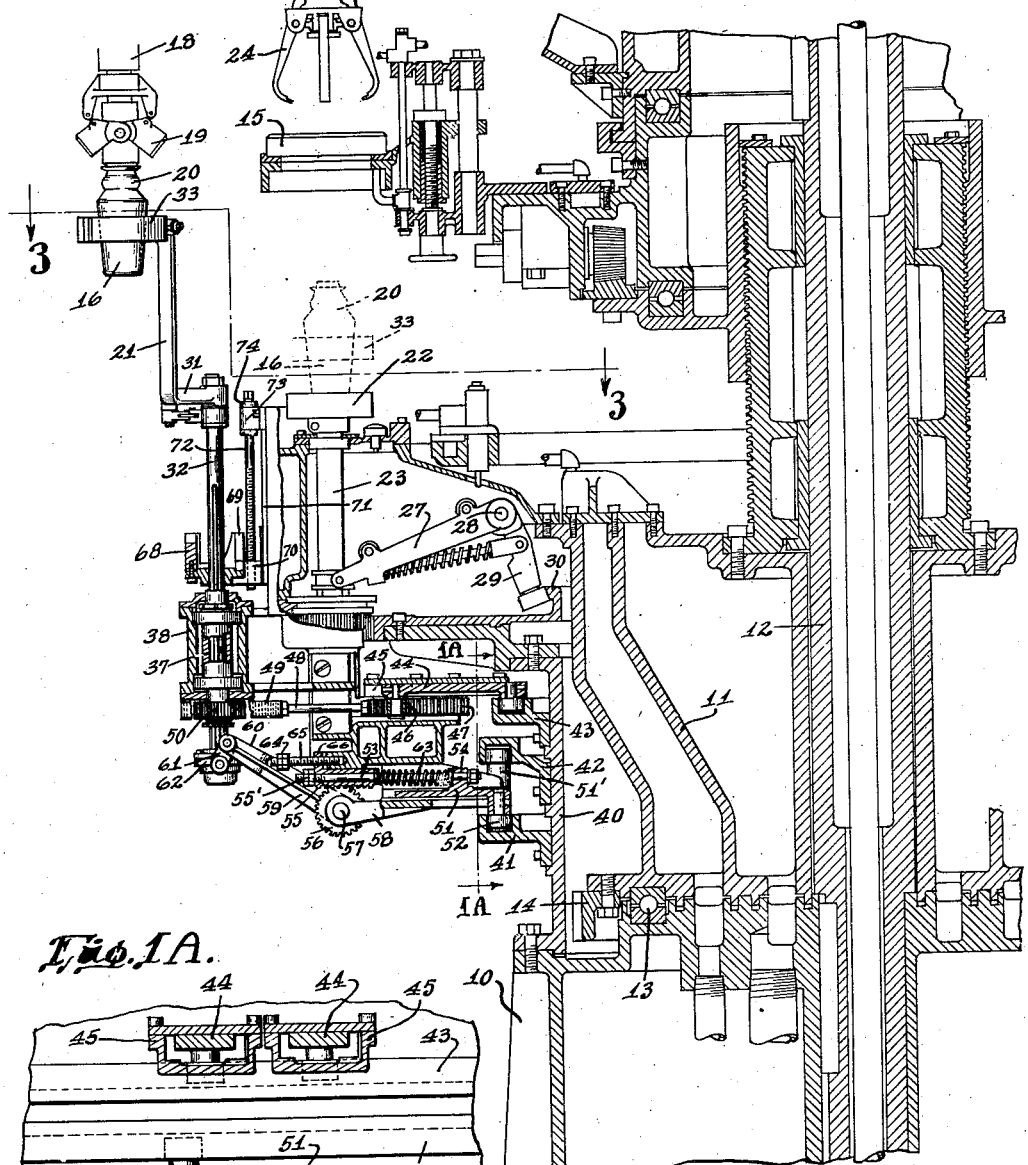
Fig. 1 is a part-sectional elevation of a burn-off machine with the article-transfer units mounted thereon, parts of the machine being broken away.
Fig. 1A is a fragmentary view in sectional elevation at the line 1A—1A on Fig. 1, showing cams for lifting and lowering the transfer arms.

Referring to Fig. 1, the article-transfer units are mounted on a burn-off machine comprising a stationary framework 10 and a carriage 11 mounted for horizontal rotation about a stationary vertical center column 12, the carriage being supported on ball bearings 13. Means for rotating the carriage continuously includes a driving gear 14 bolted to the carriage and connected through suitable gearing with an electric motor (not shown). The carriage has mounted thereon an annular series of burn-off units each comprising a ring burner 15.

Figure 3:
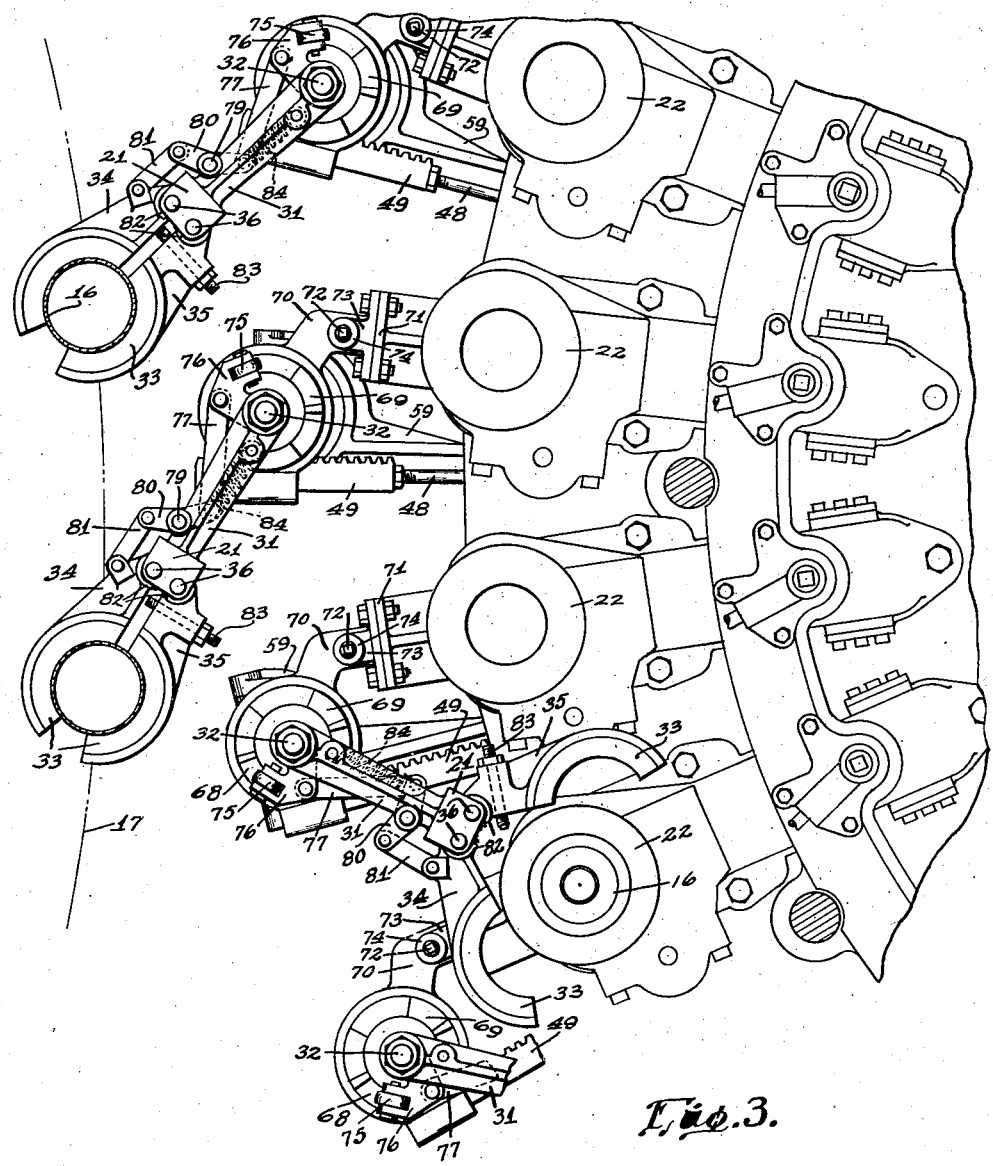
Fig. 3 is a part-sectional plan view substantially at the line 3—3 on Fig. 1.
Figure 7:
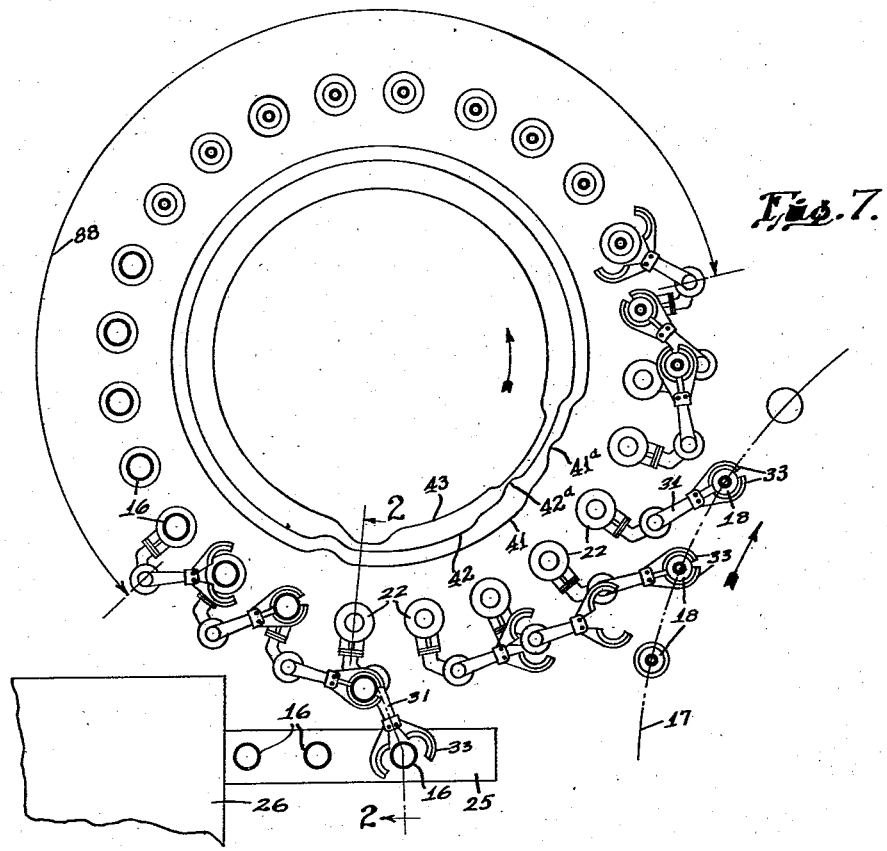
Fig. 7 is a diagrammatic plan view showing the transfer units and their operating cams.

Workpieces 16, herein shown as tumblers, are blown on a glass blowing machine indicated diagrammatically at 17 (Figs. 3 and 7). The blowing machine comprises an annular series of blowing spindles or units 18 (Figs. 1 and 7) by which gobs or charges of glass carried thereon are blown to form the tumblers 16. Each spindle includes a pair of jaws 19 which are opened automatically to release the workpiece comprising the tumbler with the moil 20 of waste glass by which the tumbler is connected to the spindle.

When the workpiece is released from the spindle 18, it is transferred by a transfer unit, comprising a transfer arm 21, to a holder 22 on a vertical stem 23. The holder 22 is then moved upward vertically to carry the workpiece into the ring burner 15. A set of gripping jaws 24 then grips the workpiece and holds it while the burner severs the moil, leaving the tumbler 16 on the holder 22. The holder with the tumbler thereon is then lowered, after which the transfer arm 21 operates to pick up the tumbler and transfer it to a belt conveyor 25 (Fig. 7) by which it is carried into an annealing lehr 26. The means for lifting and lowering the holder 22 with the workpiece thereon comprises a rock arm 27 connected to a rock shaft 28 to which is also connected a rock arm 29 with a cam follower roll running on a stationary cam 30.

The article-transfer units, each comprising a transfer arm 21, are mounted on the carriage 11 of the burn-off machine adjacent to the burner units, there being one transfer unit for each burner unit. Each transfer arm 21 comprises a vertical section and an integral horizontal arm 31 at the lower end thereof. The arm 31 is attached to the upper end of a vertical rock shaft 32. The transfer arm carries at its upper end an article-holding cup 33 which comprises a pair of arc-shaped jaws formed integral with a pair of arms 34 and 35 (Fig. 3) mounted to swing about pivots 36 in the upper end of the arm 21, for opening and closing the cup. The rock shaft 32 is mounted for up-and-down movement and also for rotation about its axis, for lifting and lowering the cup 33 and for swinging it horizontally for transferring articles as hereinafter described. The shaft 32 extends through a vertical tubular shaft 37 which is mounted for rotation in a cylindrical casing 38 forming part of the carriage 11. The shafts 32 and 37 are formed with vertical ribs providing a driving connection therebetween while permitting vertical movement of the shaft 32.

Figure 6:
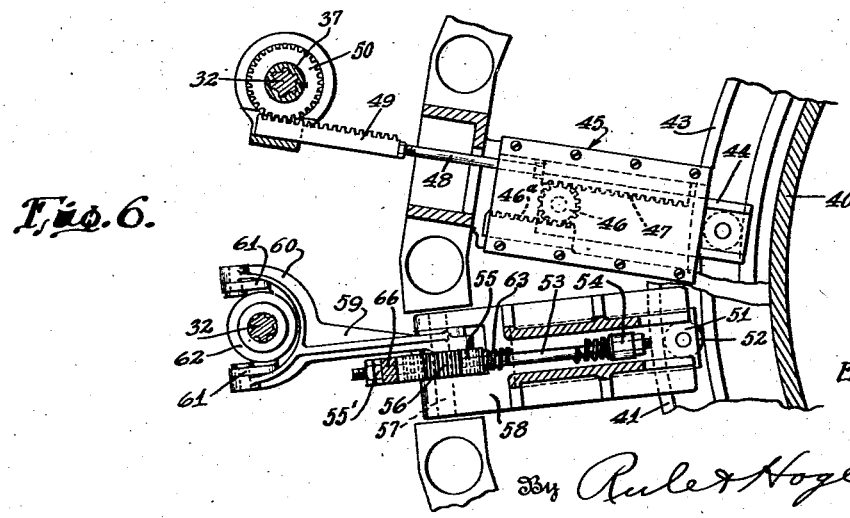
Fig. 6 is a part-sectional plan view of adjacent transfer units showing cam-operated means for rotating and for lifting and lowering the transfer arms.

Referring to Fig. 1, the machine includes a stationary cam drum 40 on which are mounted cams 41, 42, and 43 controlling the vertical and rotative movements of the shafts 32. The cam 43 operates a slide bar 44 (Figs. 1, 1A, 2, and 6) mounted to reciprocate radially of the carriage in guideways formed in an arm 45. The slide bar carries a pinion 46 which runs in mesh with a rack bar 47 connected through a rod 48 to a rack bar 49 which runs in mesh with a pinion 50 keyed to the lower end of the shaft 37. The pinion 46 also runs on a rack 46ᵃ (Fig. 6) which is held in fixed position on the carriage. There is thus provided a speed multiplying drive between the slide bar 44 and the rack bar 49. The cam 43 operates through the gearing just described to rotate the shaft 32, the cam 43 being shaped and designed to impart the desired rotative movements to the shaft as hereinafter set forth.

The transfer arms are adapted to operate in pairs when taking articles off the forming machine 17 as indicated in Fig. 7, but operate singly and in succession when transferring the articles to the belt conveyor. In order to effect such operations, separate cams 41 and 42 are provided, each controlling the vertical movement of the shafts 32 of alternate transfer units. The cam 41 operates slide bars 51 each carrying a cam roll 52 running on the cam, the slide bar being mounted for movement radially of the machine. A rod 53 (Fig. 2) extending in line with the slide bar 51, is slidably connected with said bar by means of a lug 54 having an opening through which the inner end portion of the rod extends. A rack bar 55 is mounted on the rod 53, and is adjustable thereon by means of adjusting nuts 55'. The rack runs in mesh with a pinion 56 keyed to a shaft 57 journaled in an arm 58 on the carriage 11. A rock arm 59 keyed to the shaft 57 and extending forwardly therefrom has a bifurcated end 60 (Figs. 2 and 6) connected through a pair of links 61 to a head 62 attached to the lower end of the shaft 32.

A coil spring 63 mounted on the rod 53 is held under compression between the lug 54 and the rack bar 55 and provides a yielding driving connection between the slide bar 51 and the rack bar. When the slide bar 51 is moved outwardly by its cam, it operates through the spring 63 to drive the rack bar and the pinion 56, thereby swinging the arm 59 downwardly and lowering the transfer arm. This outward movement of the rack bar is limited by a stop nut 64 on a stop rod 65 attached to the carriage. The stop nut is adjustable to limit the outward movement of the rack bar. The rod 65 extends through an opening in a lug 66 on the rack bar, thus serving as a guide and holding the rack bar against rotative movement. The coil compression spring 63 provides a yielding driving connection which serves as a safety means, so that in the event of any obstruction hindering the downward movement of the transfer arm, the slide 51 can continue its movement under the control of the cam. The spring 63 also permits adjustment of the lower stop position of the transfer arm independently of its driving cam.

Each transfer unit includes mechanism for opening and closing the cup sections 33. Such mechanism comprises cams 68 and 69 mounted on a block 70 adjustable up and down in a slideway 71 on the carriage. Means for adjusting the cams up and down includes an adjusting rod 72 journaled in a bearing sleeve 73 between collars 74 on the rod, the latter having a screw-threaded connection with the block 70. The cams 68 and 69 are also individually adjustable rotatively about the axis of the shaft 32 and held in adjusted position by screw bolts 70' extending through elongated slots in the block 70. Driving connections between the jaws 33 and their operating cams include a cam follower roll 75 on a rock arm 76 mounted to rock on the shaft 32. The rock arm 76 is connected by a link 77 to a rock arm 78 on the lower end of a vertical rock shaft 79 carried on the arm 21. A rock arm 80 on the upper end of the shaft 79, is connected by a link 81 to the arm 34.

The cams 68 and 69 are operable through the linkage just described to swing the arm 34 about its pivot 36 for opening the jaws 33. Intermeshing gear segments 82 (Fig. 3) are keyed to the pivot shafts 36 so that the jaws 33 are connected for simultaneous swinging movement. The jaws 33 are swung to closed position by a coil tension spring 84 anchored at its opposite ends to the rock arm 78 (Fig. 2) and the arm 31.

Referring to Figs. 3 and 7, it will be seen that the transfer cups 33 travel in a path such that two of the cups are in vertical alignment with a pair of spindles 18 at one time for receiving workpieces released simultaneously from the two spindles. This adapts the transfer mechanism for use with a glass blowing machine which releases the workpieces in pairs. In order to obtain this operation of the transfer arms, and also permit them to transfer the workpieces singly and in succession, the separate cams 41 and 42 (Figs. 1, 1A) are provided for lifting the transfer cups so that two of said cups, one in advance of the other, may be lifted simultaneously by their respective cams into position for receiving the two workpieces as the latter are simultaneously released from the spindles 18. The slide bars 51 (Figs. 1 and 1A) operated by the cam 41 alternate with rack bars 51' operated by the cam 42. Referring to Fig. 7, it will be seen that the cam 42 has a lifting section 42ᵃ in advance of the lifting section 41ᵃ of the cam 41 so that the transfer cups are lifted in pairs.

The operation of the transfer mechanism is as follows:

As the burn-off machine and the blowing machine 17 rotate in the directions indicated by the arrows (Fig. 7), the transfer arms are swung outward by the stationary cam 43 to bring the transfer cups 33 beneath and in vertical alignment with the blowing spindles 18 and the workpieces 16 held thereby. The two transfer cups in register with a pair of the spindles are then lifted simultaneously by their respective cams 41 and 42 so that they embrace the workpieces 16. The spindle jaws 19 (Fig. 1) are now swung open, thus releasing the workpieces to the transfer arms. The two transfer arms are then swung inwardly in succession by the cam 43 which operates to rotate the shafts 32, thereby bringing the workpieces over the holders 22. Each transfer cup with the workpiece thereon is lowered after it has been brought over the holder 22, thereby placing the workpiece on the holder as shown in broken lines (Fig. 1). The workpiece is seated on the platform before the transfer cup has completed its downward movement.

Referring to Fig. 4, it will be seen that during the final downward movement of the transfer arm, the cam follower roll 75 runs on the cam 68 so that the shaft 79 is rocked and thereby swings the cup sections apart, thus releasing the workpiece 16. The holder 22 is now lifted by its cam 30 and carries the workpiece up into the moil ring burner 15 which operates to sever the moil 20 while the latter is held by the gripping arms 24. The holder 22 is then lowered with the tumbler 16 thereon. These burn-off operations take place while the carriage is making part of a complete revolution. Each transfer cup remains open during its travel through an arc 88 (Fig. 7) while the burn-off operation is taking place. After the holder 22 is lowered with the tumbler thereon, the cup 33 is lifted by its cam 41 or 42. The initial upward movement permits the cup sections to be closed around the tumbler by the cup-closing spring 84, while the cam roll 75 runs up the cam 68. The tumbler 16 is now supported in the transfer cup and as the latter continues its upward movement, the cam 43 operates to rotate the shaft 32 and thereby swings the cup, with the tumbler carried thereby, outwardly to a position over the belt conveyor 25 (Figs. 2 and 7). The shaft 32 is then moved downward so that the cup is lowered and deposits the tumbler 16 on the conveyor. During the final downward movement of the cup, the cam 69 (Fig. 5) engages the roll 75 and operates to swing the cup sections apart. The shaft 32 is lifted so that the cup clears the tumbler and is then rotated to swing the cup inwardly thus completing the cycle.

Modifications may be resorted to within the spirit and scope of my invention.

I claim:

1. The combination of a carriage mounted to rotate about a vertical axis, article transfer mechanism comprising a vertical rock shaft journaled on the carriage to rock about its vertical axis, a transfer arm fixed to said shaft and extending laterally therefrom, an article holder comprising a pair of jaws pivotally mounted on said arm for swinging movement toward and from each other, automatic means controlled by the rotation of the carriage for rocking said shaft and thereby swinging said holder from an article-receiving position between the rock shaft and the axis of the carriage and a discharging position laterally beyond the carriage, means controlled by the rotation of the carriage for lifting and lowering the rock shaft and transfer arm, and means operable by and during the upward movement of the transfer arm to swing the jaws toward each other to an article-holding position and operable by the downward movement of the transfer arm to swing the jaws apart.

2. The combination of a machine base, a carriage mounted thereon for rotation about a vertical axis, article transfer mechanism comprising a vertical rock shaft journaled on the carriage, a transfer arm attached to and extending laterally from said rock shaft, an article-holding cup mounted on said arm and comprising jaws pivoted to swing to and from an article-holding position, a stationary cam drum on the machine base, cams attached to said drum and comprising cam tracks extending circumferentially of the carriage, means providing operating connections between one said cam and the rock shaft for rocking the latter about its axis, means providing operating connections between another said cam and the rock shaft for lifting and lowering the latter, and means controlled by the lifting and lowering movements of the rock shaft for causing said swinging of the holding jaws to said article-holding position during the upward movement of the rock shaft and transfer arm, and from article-holding position during the downward movement of the rock shaft and transfer arm.

3. The combination of a carriage mounted for rotation about a vertical axis, article transfer units mounted on the carriage and arranged in an annular series, said units each comprising a vertical rock shaft mounted on the carriage for up-and-down movement and for rotation about its axis, means for rotating each said shaft, stationary cams extending circumferentially of the carriage, and mechanisms individual to said rock shafts each providing operating connections between its rock shaft and a said cam for lifting and lowering the rock shaft, alternate rock shafts of the series having said connections with one said cam and the other rock shafts with the other said cam.

4. The combination of a carriage mounted for rotation about a vertical axis, an annular series of article transfer units mounted on the carriage for rotation therewith, each said unit comprising a transfer arm and an article holder on said arm, means for rocking each said arm for swinging the article holder from an article-receiving position at one side of the carriage to a discharging position over the carriage, means for lifting and lowering the transfer arms comprising stationary cams, means providing operating connections between one said cam and alternate rock arms of said series, and means providing operating connections between the other said cam and the other rock arms, said cams being shaped and arranged to cause the article holders to be lifted in pairs when swung outward for receiving articles.

5. The combination of a carriage mounted for rotation about a vertical axis, an annular series of article transfer units mounted on the carriage for rotation therewith, each said unit comprising a transfer arm and an article holder on said arm, means for rocking each said arm for swinging the article holder from an article-receiving position at one side of the carriage to a discharging position over the carriage, means for lifting and lowering the transfer arms comprising stationary cams, means providing operating connections between one said cam and alternate rock arms of said series, means providing operating connections between the other said cam and the other rock arms, said cams being shaped and arranged to cause the article holders to be lifted in pairs when swung outward for receiving articles, each said article holder comprising a pair of jaws mounted on the transfer arm for swinging movement toward and from each other, and automatic means controlled by the lifting and lowering movements of the said arms for swinging said jaws.

6. Article transfer mechanism comprising a support, a vertical rock shaft mounted for rocking movement and up-and-down movement on said support, a transfer arm attached to the rock shaft and extending laterally therefrom, an article-holding cup comprising holding members pivotally mounted on said arm for swinging movement toward and from each other, a rock arm mounted on said shaft for rocking movement about the axis of the shaft, means providing operating connections between said rock arm and the said article-holding members, a cam follower roll on said rock arm, and a cam mounted on said support and positioned and arranged in the path of said roll and operable by the vertical movement of the rock shaft to operate said article-holding members.

7. Article transfer mechanism comprising a support, a vertical rock shaft mounted for rocking movement and up-and-down movement on said support, a transfer arm attached to the rock shaft and extending laterally therefrom, an article-holding cup comprising holding members pivotally mounted on said arm for swinging movement toward and from each other, a rock arm mounted on said shaft for rocking movement about the axis of the shaft, means providing operating connections between said rock arm and the said article-holding members, a cam follower roll on said rock arm, means for lowering the rock shaft and rock arm, a cam positioned in the path of said roll and operable to swing said article-holding members apart when the rock shaft and said members are lowered, and means for swinging said holding members to article-holding position when the shaft is lifted.

8. Article transfer mechanism comprising a vertical rock shaft, a frame in which said shaft is mounted for up-and-down bodily movement and for rocking movement about its axis, a transfer arm on the rock shaft and extending laterally therefrom, an article holder carried on said arm and comprising a pair of article-holding members pivoted on said arm to swing toward and from each other for holding and releasing articles, means for rocking said shaft and thereby swinging the article holder from one position to another, and means for swinging said article-holding members about their pivots comprising a rock arm mounted on the said rock shaft for rocking movement relative thereto, a cam follower roll on said rock arm, means providing operating connections between the rock arm and said article-holding members for swinging the latter when said arm is rocked, and a cam positioned in the path of said roll and operable when the rock shaft is lowered to swing said rock arm and thereby swing the article-holding members about their pivots.

9. Article transfer mechanism comprising a vertical rock shaft, a frame in which said shaft is mounted for up-and-down bodily movement and for rocking movement about its axis, a transfer arm on the rock shaft and extending laterally therefrom, an article holder carried on said arm and comprising a pair of article-holding members pivoted on said arm to swing toward and from each other for holding and releasing articles, means for rocking said shaft and thereby swinging the article holder from one position to another, and means for swinging said article-holding members about their pivots comprising a rock arm mounted on the said rock shaft for rocking movement relative thereto, a cam follower roll on said rock arm, means providing operating connections between the rock arm and said article-holding members for swinging the latter when said arm is rocked, cams positioned below and in the path of said cam follower roll, one said cam being positioned and arranged to swing the article-holding members apart when the transfer arm is lowered with the article holder at one said position, the other cam being positioned to swing said article-holding members apart when the rock shaft is lowered at the other said position, and spring means for swinging the article-holding members about their pivots to article-holding position when the rock shaft is lifted.

EDWARD H. BENNETT.